United States Patent
Hiroki

(10) Patent No.: US 7,824,564 B2
(45) Date of Patent: Nov. 2, 2010

(54) METHOD FOR FLATTENING GLASS SUBSTRATE

(75) Inventor: Kazuyuki Hiroki, Kawasaki (JP)

(73) Assignees: Casio Computer Co., Ltd., Tokyo (JP); Sanwa Frost Industries Co., Ltd., Tokyo (JP); Nagase & Co., Ltd., Osaka-Shi (JP)

( * ) Notice: Subject to any disclaimer, the term of this patent is extended or adjusted under 35 U.S.C. 154(b) by 1047 days.

(21) Appl. No.: 11/527,292

(22) Filed: Sep. 26, 2006

(65) Prior Publication Data

US 2007/0207623 A1  Sep. 6, 2007

(30) Foreign Application Priority Data

Mar. 6, 2006 (JP) .............................. 2006-058941
Jun. 15, 2006 (JP) .............................. 2006-165580

(51) Int. Cl.
    B44C 1/22 (2006.01)
(52) U.S. Cl. .......................... 216/97; 216/98; 216/104; 438/753
(58) Field of Classification Search .................. 438/745, 438/753, 756; 216/97, 98, 99, 104
See application file for complete search history.

(56) References Cited

U.S. PATENT DOCUMENTS 4,055,458 A * 10/1977 Niederprum et al. .......... 216/97
6,646,711 B2   11/2003 Sugano
2003/0157211 A1 *  8/2003 Tsunetomo et al. ......... 425/471
2003/0205558 A1 * 11/2003 Kuzuwa et al. ............... 216/97
2006/0027535 A1    2/2006 Furuya

FOREIGN PATENT DOCUMENTS

| JP | 6-340448 A | 12/1994 |
|---|---|---|
| JP | 2005-11894 A | 1/2005 |
| JP | 2005-213096 A | 8/2005 |
| TW | 480514 B | 3/2002 |
| TW | 543014 B | 7/2003 |

OTHER PUBLICATIONS

Japanese Office Action dated Jan. 5, 2009 and English translation thereof issued in a counterpart Japanese Application No. 2006-165580.
Taiwanese Office Action dated Jun. 8, 2010 and English translation thereof, issued in counterpart Taiwanese Application No. 095136865.

* cited by examiner

Primary Examiner—Lan Vinh
(74) Attorney, Agent, or Firm—Holtz, Holtz, Goodman & Chick, PC

(57) ABSTRACT

A method for flattening a glass substrate includes the steps of preparing plural kinds of etching liquids different from one another in an etching rate, preparing the glass substrate, and etching the glass substrate at least one time with each of the etching liquids and executing the etching a plurality of times in total. When the etchings are executed the plurality of times, an etching rate of the glass substrate with one etching liquid used for one etching of plural etchings is slower than that of the glass substrate with the another etching liquid used for another etching executed after the one etching process of the plural etching processes.

19 Claims, 4 Drawing Sheets

METHOD FOR FLATTENING GLASS SUBSTRATE

CROSS-REFERENCE TO RELATED APPLICATIONS

This application is based upon and claims the benefit of priority from prior Japanese Patent Applications No. 2006-058941, filed Mar. 6, 2006; and No. 2006-165580, filed Jun. 15, 2006, the entire contents of both of which are incorporated herein by reference.

BACKGROUND OF THE INVENTION

1. Field of the Invention

The present invention relates to a method for flattening a glass substrate.

2. Description of the Related Art

For example, very high flatness may be required of a glass substrate used as a component of a liquid crystal display panel. As a conventional method for flattening such a glass substrate, there is available a method which includes preparing two kinds of etching liquids different from each other in an etching rate for the glass substrate, first etching the substrate with the etching liquid at a fast etching rate, and then with the etching liquid at a slow etching rate, thereby flattening a surface of the glass substrate (e.g., US Pat. Appln. Publication No. 2006-0027535 A1).

According to the above conventional method for flattening the glass substrate, when the surface of the glass substrate initially has concave portions such as very small flaws, if etching is first carried out with the etching liquid at the fast etching rate, the concave portions are removed together with a surface layer of the glass substrate as the etching progresses fast. If etching is next carried out with the etching liquid at the slow etching rate, the surface of the glass substrate is flattened.

According to the conventional method for flattening the glass substrate, however, as the etching is first carried out with the etching liquid at the fast etching rate, and then with the etching liquid at the slow etching rate, there is a problem that flatness of the surface of the glass substrate is not so high for reasons described below.

BRIEF SUMMARY OF THE INVENTION

It is therefore an object of the present invention to provide a method for flattening a glass substrate, which can flatten a surface of the glass substrate much more even if the surface of the glass substrate initially has concave portions such as very small flaws.

In accordance with an aspect of the present invention, there is provided a method for flattening a glass substrate, comprising:

preparing plural kinds of etching liquids different from one another in an etching rate;

preparing the glass substrate; and executing a plurality of etching processes of the glass substrate at least one time with each of the etching liquids and executing the etching processes a plurality of times in total, wherein:

when the etching processes are executed the plurality of times, an etching rate of the glass substrate with one etching liquid used for one etching process of the plural etching processes is slower than that of the glass substrate with another etching liquid used for another etching process executed after the one etching process of the plural etching processes.

In accordance with another aspect of the present invention, there is provided a method for flattening a glass substrate, comprising:

preparing plural kinds of etching liquids different from one another in an etching rate;

preparing an assembly including two glass substrates; and executing a plurality of etching processes of the assembly at least one time with each of the etching liquids and executing the etching processes a plurality of times in total, wherein:

when the etching processes are executed the plurality of times, an etching rate of the glass substrate with one etching liquid used for one etching process of the plural etching processes is slower than that of the glass substrate with another etching liquid used for another etching process executed after the one etching process of the plural etching processes, and the preparation of the assembly includes:

forming a plurality of sealing materials on one of the two glass substrates, and forming an outer peripheral sealing material having a separated opening in at least one place in an outer periphery of the one glass substrate, laminating the two glass substrates via the plurality of sealing materials and the outer peripheral sealing material, and sealing of the opening with a sealant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
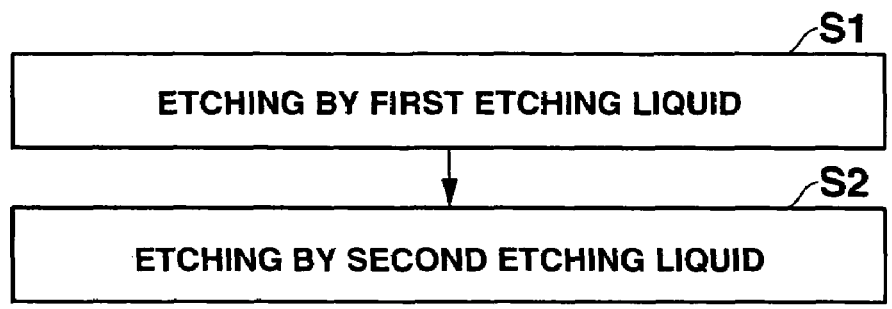
FIG. 1 is a flowchart showing a method for flattening a glass substrate according to a first embodiment of the present invention.

FIG. 1 is a flowchart showing a method for flattening a glass substrate according to a first embodiment of the present invention. First, in step S1 of FIG. 1, the glass substrate is dipped in a first etching liquid stored in a first etching tank to etch both surfaces thereof (not shown). In this case, the first etching liquid is a hydrofluoric acid aqueous solution containing a hydrofluoric acid and water, and a hydrofluoric acid concentration is adjusted so that an etching rate for the glass substrate can be relatively slow, i.e., it is not less than 0.01 µm/minute and less than 5 µm/minute.

Next, the glass substrate is taken out of the first etching liquid of the first etching tank. Then, in step S2 of FIG. 1, the glass substrate is dipped in a second etching liquid stored in the second etching tank to etch both surfaces thereof (not shown). In this case, the second etching liquid is a hydrofluoric acid aqueous solution containing a hydrofluoric acid and water, and a hydrofluoric acid concentration is adjusted so that an etching rate for the glass substrate can be faster, i.e., it is not less than 5 µm/minute and not more than 15 µm/minute, as compared with the first etching liquid.

If there are concave portions 2 such as very small flaws in an initial surface of the glass substrate 1, when etching is carried out with the first etching liquid at the slow etching rate, the concave portions 2 can be removed together with a surface layer of the glass substrate 1 while growth of the concave portions 2 is suppressed especially in a thickness direction of the glass substrate as the etching progresses slowly. Then, when etching is carried out with the second etching liquid at the etching rate faster than that of the first etching liquid, the surface of the glass substrate 1 can be flattened more.

Figure 3:
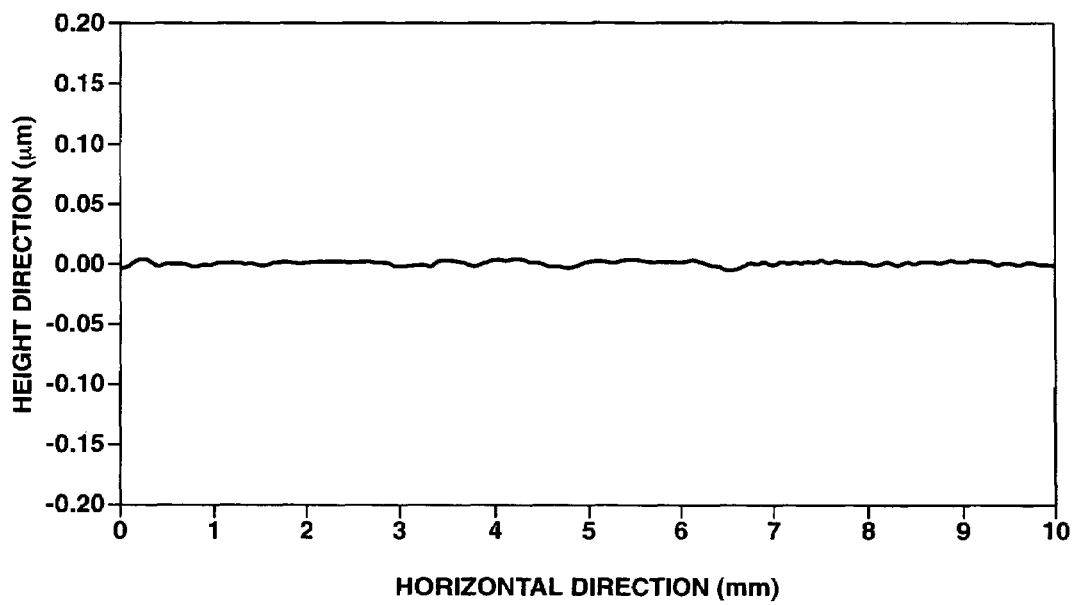
FIG. 3 is a diagram showing flatness of the surface of the glass substrate obtained by the method for flattening the glass substrate according to the first embodiment of the present invention.

The glass substrate 1 is flattened by using the glass substrate flattening method of the first embodiment, and a surface shape of a surface center of the glass substrate 1 is measured by using a high-precision fully automatic microshape measuring device (ET 4000 (stylus method) by Kosaka Research Institute, Inc) to obtain a result shown in FIG. 3. In this case, the glass substrate 1 having a size of 320 mm×400 mm is prepared, and a surface shape having a horizontal length 10 mm in its surface center is measured (same as above).

For comparison, for the glass substrate 1, as in the above case, conversely to the glass substrate flattening method of the first embodiment, etching is first carried out at the second etching rate of the relatively fast etching rate, and then etching is carried out with the first etching liquid at the relatively slow etching rate. A surface shape of the glass substrate 1 thus obtained is measured by using the measuring device to obtain a result shown in FIG. 4.

The measuring device measures the surface shape with very high precision of less than 1 µm in the thickness direction of the glass substrate 1 while it measures the surface shape in a relatively wide range, i.e., 10 mm, in a surface direction of the glass substrate 1. Accordingly, it is possible to measure flatness of the surface shape in a range wider than that of a local surface shape such as the concave portions 2 (diameter several µm to several tens of µm) such as very small flaws present in the surface of the glass substrate 1 or dimples (diameter several hundreds of µm) described below.

Figure 4:
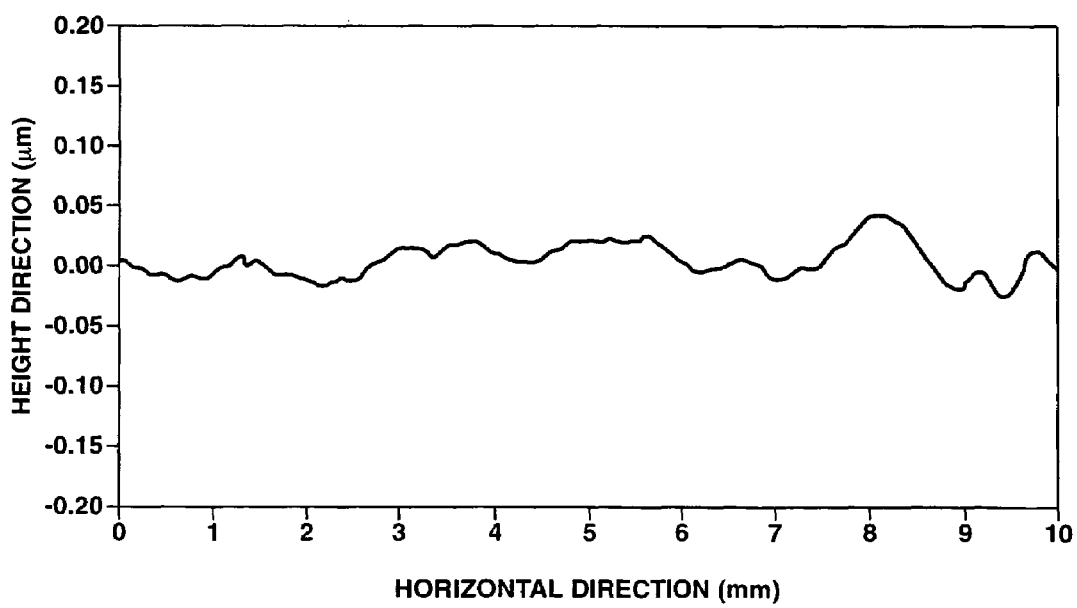
FIG. 4 is a diagram showing flatness of a surface of a glass substrate for comparison.

As apparent from FIGS. 3 and 4, surface flatness of the glass substrate 1 when the etching is carried out in the order of the first and second etching liquids shown in FIG. 3 is much better than that of the glass substrate 1 when the etching is carried out in the order of the second and first etching liquids shown in FIG. 4. Hence, according to the glass substrate flattening method of the first embodiment, it is possible to flatten the surface of the glass substrate 1 more.

Second Embodiment

Etching is carried out with, in place of the first etching liquid, a liquid obtained by adding one or more kinds of fluorine compounds to the first etching liquid (referred to as first modified etching liquid), and then etching is carried out with the second etching liquid. A surface shape of the glass substrate 1 thus obtained is measured by the measuring device to obtain a result shown in FIG. 5.

Figure 5:
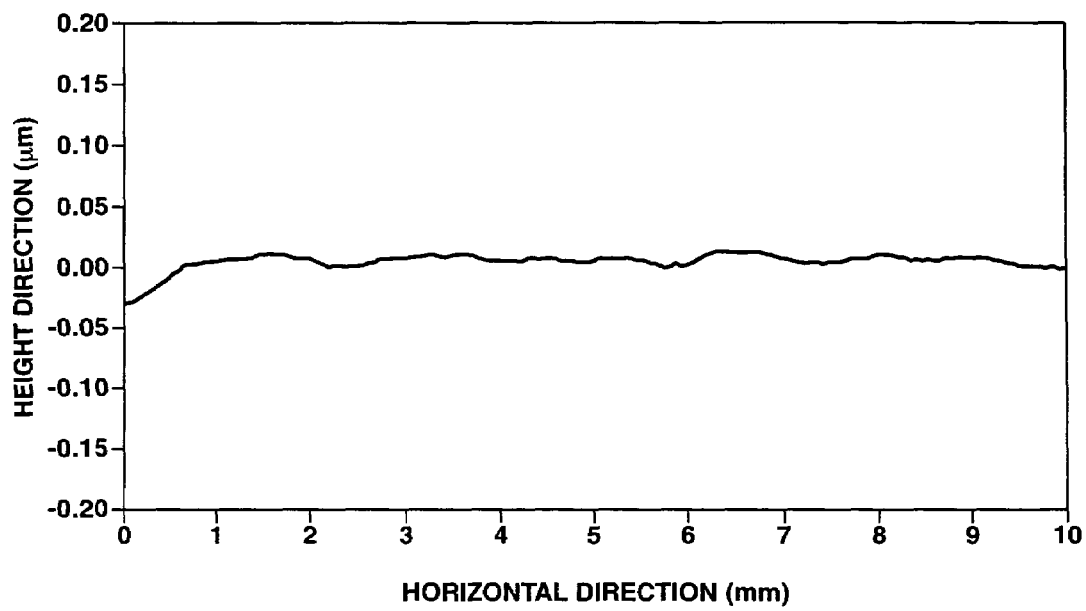
FIG. 5 is a diagram showing flatness of a surface of a glass substrate obtained by a method for flattening the glass substrate according to a second embodiment of the present invention.

As apparent from FIG. 5, surface flatness of the glass substrate is much better than that of the glass substrate 1 when the etching is carried out in the order of the second and first etching liquids shown in FIG. 4. Thus, according to the glass substrate flattening method of the second embodiment, it is possible to flatten the surface of the glass substrate 1 more.

Figure 2A:
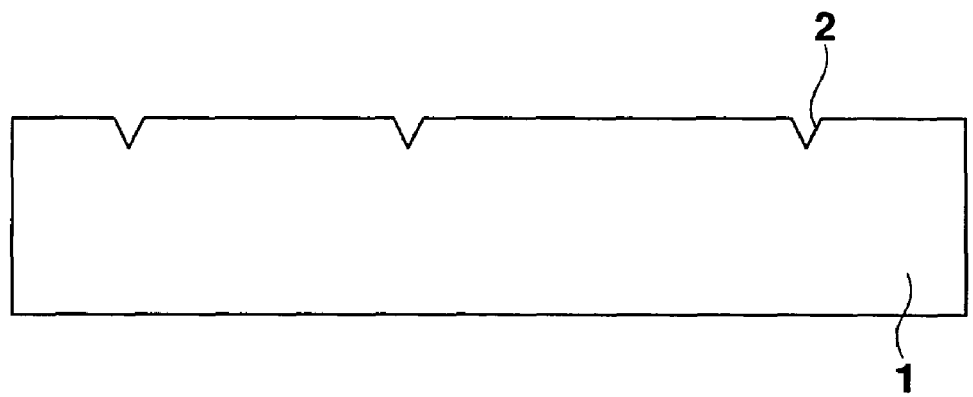
FIG. 2A is a diagram showing concave portions of a surface of the glass substrate.

According to the glass substrate flattening method of the second embodiment, as shown in FIG. 2A, if there are very small invisible concave portions 2 of sizes (diameters of several µm to several tens of µm) in the surface of the glass substrate 1, during the etching of the glass substrate 1, not only portions other than the concave portions 2 of the glass substrate 1 are etched in a thickness direction thereof but also the concave portions 2 are etched.

Figure 2B:
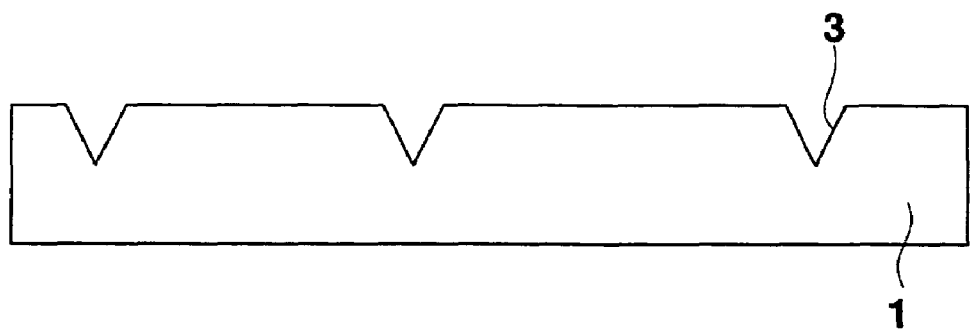
FIG. 2B is a diagram showing dimples of the surface of the glass substrate.

In this case, the concave portions 2 are isotropically etched. Thus, as shown in FIG. 2B, during the etching, the concave portions 2 may be etched in the thickness and surface directions of the glass substrate 1 to grow, becoming surface defects called dimples 3 of sizes (diameters of several hundreds of µm) to be visible at the end of etching. The surface of the glass substrate 1 may look white or rough. Therefore, third and fourth embodiments of the present invention capable of solving this problem will be described.

Third Embodiment

Figure 6:
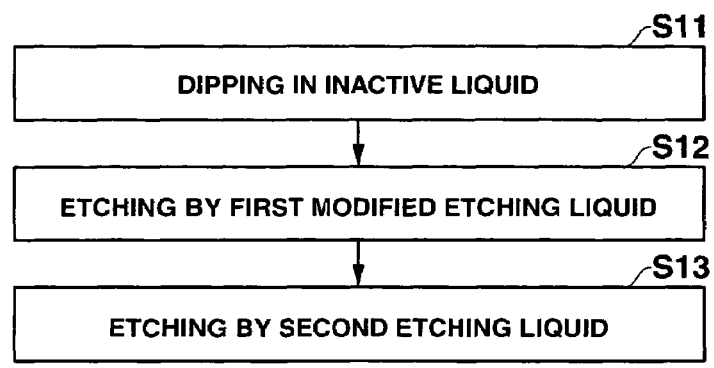
FIG. 6 is a flowchart showing a method for flattening a glass substrate according to a third embodiment of the present invention.

FIG. 6 is a flowchart showing a method for flattening a glass substrate according to the third embodiment of the present invention. In step S11 of FIG. 6, the glass substrate is dipped in an inactive liquid housed in an inactive liquid tank (not shown). In this case, the inactive liquid is inactive with respective to a first modified etching liquid and a second etching liquid and in a liquid form under an etching temperature, surface tension is smaller than that of each etching liquid, and a boiling point is higher than that of each etching liquid. Examples of the inactive liquid include perfluoroalkyl compounds such as perfuluoro-2-butyltetrohydroflan and perfluoro-2-propyltetohydropyranlo.

Figure 7A:
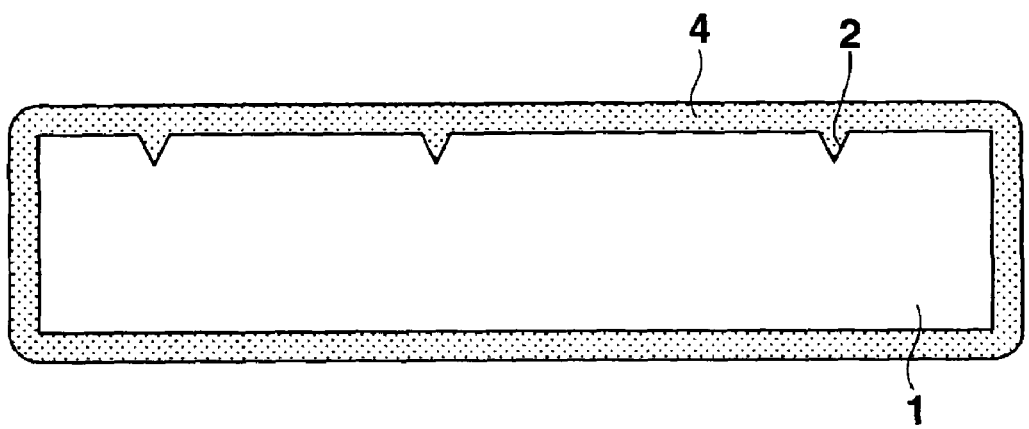
FIG. 7A is a diagram showing a state in which an inactive liquid sticks to an entire surface of the glass substrate including surface concave portions.

After the dipping of the glass substrate in the inactive liquid stored in the inactive liquid tank, the inactive liquid fills concave portions in the surface of the glass substrate. Then, the glass substrate is taken out of the inactive liquid stored in the inactive liquid tank. In this state, as shown in FIG. 7A, the inactive liquid 4 sticks to the entire surface of the glass substrate 1 including the concave portions 2.

Figure 7B:
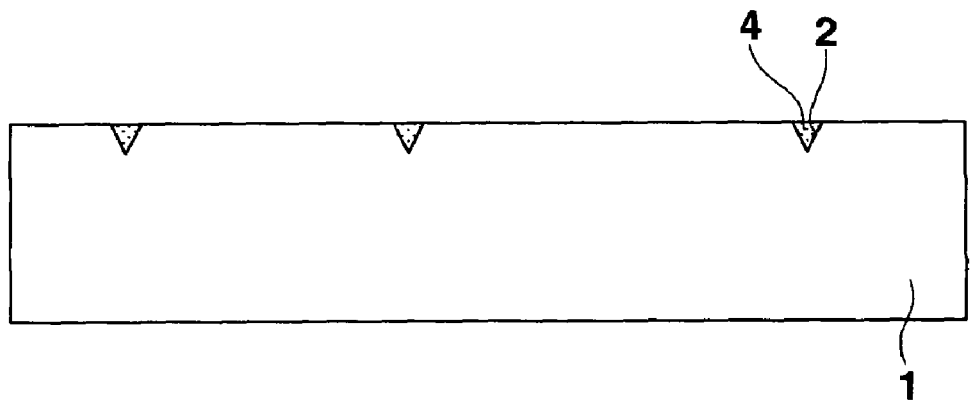
FIG. 7B is a diagram showing a state in which an inactive liquid sticks to the surface concave portions alone of the glass substrate.

Next, in step S12 of FIG. 6, the glass substrate 1 is dipped in the first modified etching liquid stored in a first modified etching tank to etch both surfaces of the glass substrate 1 (not shown). Then, after taking-out of the glass substrate 1 from the first modified etching liquid stored in the first modified etching tank, a state is set in which the inactive liquid 4 stuck to the surface of the glass substrate 1 has been removed (FIG. 7B). In this state, the inactive liquid 4 fills and are stuck to the concave portions 2 of the surface of the glass substrate 1.

Figure 7C:
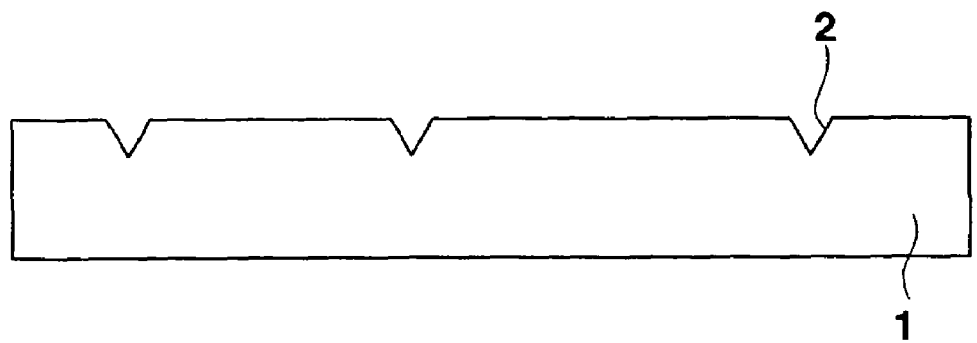
FIG. 7C is a diagram showing a state in which growth of the surface concave portions of the glass substrate is suppressed.

Next, in step S13 of FIG. 6, the glass substrate 1 is dipped in the second etching liquid stored in a second etching tank to etch both surfaces of the glass substrate 1 (not shown). Then, the glass substrate 1 is taken out of the second etching liquid stored in the second etching tank. FIG. 7C shows a state of the surface concave portions of the glass substrate 1 when the etching with the second etching liquid is finished.

According to the glass substrate flattening method of the third embodiment, when the glass substrate 1 is etched with the first modified etching liquid and the second etching liquid, as shown in FIG. 7B, as the concave portions 2 of the surface of the glass substrate are filled with the inactive liquid 4, the filling inactive liquid 4 functions as an etching mask. As shown in FIG. 7C, growth of the concave portions 2 in thickness and surface directions of the glass substrate 1 is suppressed, and generation of dimples 3 of sizes to be visible is reduced. In this case, the surface of the glass substrate 1 does not look white or rough.

Fourth Embodiment

Etching is carried out with, in place of the second etching liquid of the third embodiment, a liquid obtained by adding an inorganic oxo acid additive of 0.1 to 1.0%. During the etching carried out with the second etching liquid to which the additive has been added, an inactive liquid easily sticks to concave portions 2 of a surface of a glass substrate 1 because of the inorganic oxo acid additive. As compared with the third embodiment, generation of dimples 3 of sizes to be visible is reduced more. In this case, the surface of the glass substrate 1 does not look white or rough.

Other Embodiments

Each of the embodiments has been described by way of case in which both surfaces of the glass substrate 1 are etched to be flat. However, the present invention is not limited to the embodiments. In a state in which a protective layer made of PVC, PET, a glass, a resist or the like is formed in one entire surface of the glass substrate 1, the other surface alone of the glass substrate 1 may be etched to be flat.

In the case of manufacturing a plurality of liquid crystal display panels, the glass substrate may be flattened as follows. That is, a plurality of sealing materials are formed on one of two glass substrates having areas to enable formation of a plurality of completed liquid crystal display panels, and an outer peripheral sealing material having a separated opening in at least one place is formed of an outer peripheral part of the glass substrate. Then, these two glass substrates are stuck together via the plurality of sealing materials and the outer peripheral sealing member, and the opening is sealed with a sealant. Subsequently, surfaces of the two glass substrates of this assembly may be simultaneously etched to be flat. In this case, a protective layer may be formed in the surface of one glass substrate, and the surface only of the other glass substrate may be etched to be flat.

According to each of the embodiments, basically, the glass substrate 1 is first etched with the first etching liquid at the slow etching rate, and then the glass substrate 1 is etched with the second etching liquid at the fast etching rate. However, the present invention is not limited to this. Three or more kinds of etching liquids may be prepared, and etching may be carried out three times or more in order of the etching liquid at a slow etching rate to the etching liquid at a fast etching rate.

According to the present invention, when there are concave portions such as very small flaws in the initial surface of the glass substrate, because of a slow etching progress, the concave portions can be removed together with the surface layer of the glass substrate while growth of the concave portions especially in a thickness direction of the glass substrate is suppressed. Then, the etching is carried out with the etching liquid at the fast etching rate. Thus, it is possible to flatten the surface of the glass substrate more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method for flattening a glass substrate, comprising:
preparing a plurality of etching liquids having different etching rates;
preparing the glass substrate; and
executing a plurality of etching processes on the glass substrate at least one time with each of the plurality of etching liquids and executing the etching processes a plurality of times in total on the same glass substrate,
wherein, when the etching processes are executed the plurality of times on the same glass substrate, an etching rate of the glass substrate with one etching liquid used for one etching process of the plurality of etching processes is slower than an etching rate of the glass substrate with another etching liquid used for another etching process executed after the one etching process of the plurality of etching processes.

2. The method according to claim 1, wherein a first etching liquid contains at least one fluorine compound.

3. The method according to claim 1, wherein at least one etching process of the plurality of etching processes includes formation of a protective layer on one surface of the glass substrate.

4. The method according to claim 1, wherein the glass substrate is dipped in a liquid inactive to a first etching liquid and another etching liquid before the etching processes are executed the plurality of times.

5. The method according to claim 4, wherein the another etching liquid contains an inorganic oxo acid additive.

6. The method according to claim 1, wherein:
the etching processes include a first etching process and a second etching process,
the first etching process uses a first etching liquid whose etching rate is a predetermined value for the glass substrate, and
the second etching process uses a second etching liquid whose etching rate is faster than the predetermined value for the glass substrate.

7. The method according to claim 6, wherein:
the etching rate of the first etching liquid for etching the glass substrate is not less than 0.01 μm/minute and less than 5 μm/minute, and
the etching rate of the second etching liquid for etching the glass substrate is not less than 5 μm/minute and not more than 15 μm/minute.

8. The method according to claim 6, wherein the first etching liquid contains at least one fluorine compound.

9. The method according to claim 6, wherein the glass substrate is dipped in a liquid inactive to the first and second etching liquids before the etching processes are executed the plurality of times.

10. The method according to claim 9, wherein the second etching liquid contains an inorganic oxo acid additive.

11. A method for flattening a glass substrate, comprising:
preparing a plurality of etching liquids having different etching rates;
preparing an assembly including two glass substrates; and
executing a plurality of etching processes on the assembly at least one time with each of the etching liquids and executing the etching processes a plurality of times in total,
wherein when the etching processes are executed the plurality of times, an etching rate with one etching liquid used for one etching process of the plurality of etching processes is slower than an etching rate with another etching liquid used for another etching process executed after the one etching process of the plurality of etching processes, and
wherein the preparation of the assembly includes:
forming a plurality of sealing materials on one of the two glass substrates, and forming an outer peripheral sealing material having a separated opening in at least one place in an outer periphery of the one glass substrate,
laminating the two glass substrates via the plurality of sealing materials and the outer peripheral sealing material, and
sealing the opening with a sealant.

12. The method according to claim 11, wherein each of the glass substrates has an area which permits formation of a plurality of completed liquid crystal display panels.

13. The method according to claim 11, wherein the etching processes include an etching process of one surface of the assembly to flatten the surface.

14. The method according to claim 13, wherein when the etching processes are executed the plurality of times, prior to the etching process of one surface of the assembly to flatten the same, a protective layer is formed on the other surface of the assembly.

15. The method according to claim 13, wherein when the etching processes are executed the plurality of times, simultaneously with the etching process of one surface of the assembly to flatten the same, the other surface of the assembly is etched to be flattened.

16. The method according to claim 11, wherein:
the etching processes include a first etching process and a second etching process,
the first etching process uses a first etching liquid whose etching rate is a predetermined value for the glass substrate, and
the second etching process uses a second etching liquid whose etching rate is faster than the predetermined value for the glass substrate.

17. The method according to claim 16, wherein the first etching liquid contains at least one fluorine compound.

18. The method according to claim 16, wherein the glass substrate is dipped in a liquid inactive to the first and second etching liquids before the etching processes are executed the plurality of times.

19. The method according to claim 18, wherein the second etching liquid contains an inorganic oxo acid additive.

* * * * *